United States Patent Office 3,772,378
7-OXO-BENZOCYCLOHEPTENE ACETIC ACIDS
William J. Houlihan, Mountain Lakes, N.J., assignor to Sandoz-Wander, Inc., Hanover, N.J.
No Drawing. Filed Dec. 1, 1971, Ser. No. 203,900
Int. Cl. C07c 65/20
U.S. Cl. 260—515 P          5 Claims

ABSTRACT OF THE DISCLOSURE

Benzocycloheptene acetic acids, e.g. 7-oxo-7H-benzocycloheptene-6,8-diacetic acid, are prepared by reacting a phthalaldehyde with a keto-carboxylic acid. The resulting products are useful as anti-diabetic agents.

---

This invention relates to novel benzocycloheptene acetic acids and their preparation and to the use of such compounds and compositions containing them as anti-diabetic agents.

The compounds of this invention can be represented by the Formula I:

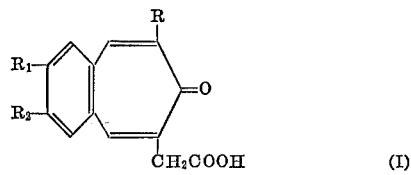

wherein

R is hydrogen or —CH$_2$COOH

R$_1$ and R$_2$ are, independently, hydrogen, fluoro, chloro, bromo, hydroxy, alkyl of 1 to 4 carbon atoms, e.g. methyl, ethyl or isopropyl, alkoxy of 1 to 4 carbon atoms, e.g. methoxy, ethoxy or butoxy, or R$_1$ and R$_2$ together form methylenedioxy, or their pharmaceutically acceptable salts, e.g. alkali metal salts.

Preferably R is —CH$_2$COOH and R$_1$ and R$_2$ are the same or, if different, one of R$_1$ and R$_2$ is hydrogen.

The compounds of Formula I can be prepared by reacting a compound of the Formula II:

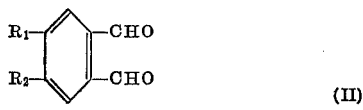

wherein R$_1$ and R$_2$ are as defined above, with a compound of the formula III:

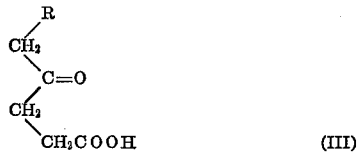

wherein R is as defined above, at elevated temperatures in the presence of a strong base and an organic solvent.

The compounds of Formulae II and III are generally employed in stoichiometrically equivalent amounts, although the proportions can vary. Any strong base can be employed, such as the alkali metal and alkali earth metal hydroxides, particularly sodium hydroxide, potassium hydroxide or barium hydroxide. It should be used in amounts sufficient to at least neutralize the acetic acid groups. The organic solvents conventionally used in condensation reactions of this general type can be employed, preferably a lower alcohol, such as ethanol. The reaction is carried out at a temperature in the range of from about 50° to about 150° C., preferably at the reflux temperature of the reaction mixture. Reaction times can range from about 1 to 20 hours. Under preferred conditions the reaction time is generally about 2 to 10 hours.

The compounds of the Formula I form salts and the pharmaceutically acceptable salts thereof are included within the scope of the present invention. Such salts forming pharmaceutically acceptable compounds of the Formula I include, e.g. the sodium salt and the triethyl ammonium salt. In general the salts may be produced from the free acids by established procedures. Conversely, the free acids may be obtained from the salts by well-known procedures.

The compounds of Formulae II and III are known or can be produced from known compounds using conventional techniques.

The compounds of Formula I and their pharmaceutically acceptable salts are useful because they exhibit pharmacological activity in animals such as mammals, particularly anti-diabetic activity, as indicated by measurement of sugar levels in heparinized blood samples from male Wistar rats made diabetic by injection of alloxan monohydrate and dosed orally with the compound of Formula I at a daily dosage rate of 50 to 400 mg./kg. For such use, the compounds may be combined with a pharmaceutically acceptable carrier and such other conventional adjuvants as may be necessary and administered orally in such forms as tablets, capsules, elixirs, suspensions and the like or parenterally in the form of an injectable solution or suspension.

The dosage of active ingredient employed may vary depending on the particular compound employed, the method of administration and the severity of the condition being treated. However, in general, satisfactory results are obtained when the compounds (I) are administered at a daily dosage of from about 5 milligrams to about 400 milligrams per kilogram of animal body weight, preferably given as a single dose although divided doses, two to four times a day, or sustained release forms may be used. For most large mammals, the total daily dosage is from about 350 to about 3000 milligrams. Dosage forms suitable for internal use comprise from about 90 to about 3000 milligrams of the active compound in intimate admixture with a solid or liquid pharmaceutically acceptable carrier or diluent.

The compounds of Formula I may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The sterile injectable compositions are formulated as known in the art and may contain appropriate dispersing or wetting agents and suspending agents identical or similar to those mentioned above. These pharmaceutical preparations may contain up to about 90% of the active ingredient in combination with the carrier or adjuvant.

The preferred pharmaceutical compositions from the standpoint of preparation and the ease of administration are solid compositions, particularly hard-filled capsules and tablets.

The following examples are for purposes of illustration.

EXAMPLE A

Preparation of 7-oxo-7H-benzocycloheptene-6,8-diacetic acid

A mixture of 24.9 g. (0.186 mole) phthalaldehyde, 34.8 g. (0.186 mole) 4-ketopimelic acid, 24 g. (0.6 mole) sodium hydroxide and 800 ml. ethanol is heated at reflux with vigorous stirring for 4.5 hours. The mixture is cooled to room temperature and filtered. The solid is stirred 3 hours with conc. HCl, filtered and the resulting solid washed twice with 100 ml. $H_2O$ and twice with 100 ml. isopropanol. The resulting solid is further purified by refluxing with 200 ml. of a 50:50 mixture of methanol and chloroform for ½ hour and filtered to give 7-oxo-7H-benzocycloheptene-6,8-di-acetic acid, M.P. 242–243° C. (decomp.).

EXAMPLE 1

Tablets

Tablets suitable for oral administration which contain the following ingredients may be prepared by conventional tabletting techniques. Such tablets are useful in treating diabetes at a dose of one tablet 4 times a day.

| Ingredient: | Weight (mg.) |
|---|---|
| 7 - oxo - 7H - benzocycloheptene-6,8-di-acetic acid | 100 |
| Tragacanth | 10 |
| Lactose | 147.5 |
| Corn starch | 25 |
| Talcum | 15 |
| Magnesium stearate | 2.5 |

EXAMPLE 2

Dry filled capsules

Capsules suitable for oral administration which contain the following ingredients are prepared in a conventional manner. Such capsules are useful in treating diabetes at a dose of one capsule per day.

| Ingredient: | Weight (mg.) |
|---|---|
| 7 - oxo - 7H - benzocycloheptene-6,8-di-acetic acid | 400 |
| Inert solid diluent (lactose) | 600 |

What is claimed is:
1. A compound of the formula

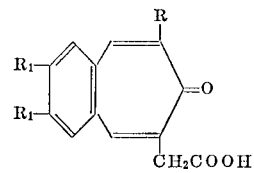

wherein
R is hydrogen or —$CH_2COOH$
$R_1$ and $R_2$ are, independently, hydrogen, fluoro, chloro, bromo, hydroxy, alkyl of 1 to 4 carbon atoms, alkoxy of 1 to 4 carbon atoms,
or $R_1$ and $R_2$ together form methylenedioxy,
or its pharmaceutically acceptable salts.

2. A compound of claim 1 wherein R is —$CH_2COOH$.
3. A compound of claim 1 wherein $R_1$ nad $R_2$ are the same.
4. A compound of claim 3 wherein $R_1$ and $R_2$ are hydrogen.
5. The compound of claim 4 having the formula

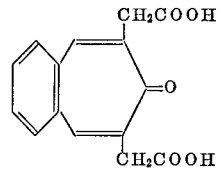

References Cited

Thiele et al.: Ann. 369 (1909), pp. 288, 289, 294, 295 and 297.

Ried et al.: Ber. 91 (1958), pp. 566, 571 and 572.

JAMES A. PATTEN, Primary Examiner

U.S. Cl. X.R.

260—340.5, 501.1, 515 R, 515 A, 520; 424—282, 316, 317